US012056076B2

(12) United States Patent
Israel Vijayponraj et al.

(10) Patent No.: US 12,056,076 B2
(45) Date of Patent: Aug. 6, 2024

(54) END-TO-END ISOLATION OVER PCIE

(71) Applicant: TEXAS INSTRUMENTS INCORPORATED, Dallas, TX (US)

(72) Inventors: Kishon Vijay Abraham Israel Vijayponraj, Bangalore (IN); Sriramakrishnan Govindarajan, Bangalore (IN); Mihir Narendra Mody, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 166 days.

(21) Appl. No.: 17/135,129

(22) Filed: Dec. 28, 2020

(65) Prior Publication Data
US 2021/0200707 A1 Jul. 1, 2021

(51) Int. Cl.
*G06F 13/40* (2006.01)
*G06F 13/16* (2006.01)
*G06F 13/42* (2006.01)
*G06F 21/45* (2013.01)

(52) U.S. Cl.
CPC ...... *G06F 13/4027* (2013.01); *G06F 13/1668* (2013.01); *G06F 13/4282* (2013.01); *G06F 21/45* (2013.01); *G06F 2213/0026* (2013.01)

(58) Field of Classification Search
CPC ... G06F 13/4027; G06F 13/4282; G06F 21/45
See application file for complete search history.

(56) References Cited

U.S. PATENT DOCUMENTS

| | | | | |
|---|---|---|---|---|
| 7,308,523 | B1 * | 12/2007 | Ngai | G06F 13/4282 710/316 |
| 9,988,495 | B2 * | 6/2018 | Wang | C08G 75/28 |
| 11,038,749 | B2 * | 6/2021 | Li | G06F 9/30134 |
| 2011/0246686 | A1 * | 10/2011 | Cavanagh, Jr. | G06F 13/28 710/22 |
| 2013/0132682 | A1 * | 5/2013 | Kassoff | G06F 13/1684 711/143 |
| 2013/0133682 | A1 * | 5/2013 | Yoe | A45D 20/124 132/227 |
| 2013/0254452 | A1 * | 9/2013 | Ajanovic | G06F 13/4059 710/315 |
| 2015/0178241 | A1 * | 6/2015 | Ajanovic | G06F 13/385 710/29 |
| 2019/0042508 | A1 * | 2/2019 | Raghav | G06F 9/30141 |
| 2019/0243757 | A1 * | 8/2019 | Liang | G06F 13/20 |
| 2020/0210363 | A1 * | 7/2020 | Raghav | G06F 13/4282 |
| 2021/0216453 | A1 * | 7/2021 | Liang | G06F 12/0802 |
| 2021/0243757 | A1 * | 8/2021 | Huang | H04L 5/0094 |

* cited by examiner

*Primary Examiner* — Henry Tsai
*Assistant Examiner* — Christopher A Daley
(74) *Attorney, Agent, or Firm* — Michael T. Gabrik; Frank D. Cimino (57) ABSTRACT

In some examples, a method includes receiving a transaction at an inbound port, the transaction including a requester identification (ID), a traffic class, and a peripheral component interconnect express (PCIe) address. The method includes providing an attribute based at least in part on the traffic class. The method includes providing a context ID based on the attribute and the requester ID. The method includes accessing a region of memory responsive to the transaction, the region of memory corresponding to the context ID.

19 Claims, 6 Drawing Sheets

END-TO-END ISOLATION OVER PCIE

CROSS-REFERENCE TO RELATED APPLICATION

This application claims priority to Indian Provisional Patent Application No. 201941054201, which was filed Dec. 27, 2019, is titled "END-TO-END ISOLATION OVER PCIE," and is hereby incorporated herein by reference in its entirety.

BACKGROUND

Peripheral component interconnect express (PCIe) is a high-speed serial interface standard. A PCIe implementation uses serial links to connect a host (known as a root complex (RC)) to switches and endpoints. An endpoint provides one or more functionalities, such as memory access, to a host system with an RC. The endpoints can be connected directly to the RC or through a switch. A switch is useful when more than one endpoint is connected to the RC.

SUMMARY

In some examples, a method includes receiving a transaction at an inbound port, the transaction including a requester identification (ID), a traffic class, and a peripheral component interconnect express (PCIe) address. The method includes providing an attribute based at least in part on the traffic class. The method includes providing a context ID based on the attribute and the requester ID. The method includes accessing a region of memory responsive to the transaction, the region of memory corresponding to the context ID.

In some examples, a system includes an application configured to generate a peripheral component interconnect express (PCIe) transaction, the transaction having a local quality of service (QoS) attribute and a context identification (ID). The system includes a traffic access controller configured to select a port in an interconnect for the transaction, the selected port based at least in part on the local QoS attribute of the application. The system includes a multiplexer configured to receive the transaction from the selected port and transmit the transaction on a PCIe link, the transaction transmitted with a PCIe device identification (ID) and a traffic class based at least in part on the selected port.

DETAILED DESCRIPTION

PCIe is useful in distributed processing systems that carry high processing requirements, such as in automated driving applications. In some such systems, multiple SoCs connect to each other using PCIe, with each of the SoCs being capable of carrying a high processing load. Each SoC may execute multiple applications. Some of these applications may be used for critical tasks such as safety applications (e.g., analytics), while other applications may be used for non-safety applications that are less critical, such as processing graphics or displaying information.

For safety applications, a technique called end-to-end isolation provides many benefits. End-to-end isolation entails keeping transactions for one application separate from transactions for another application throughout the entirety of the system. End-to-end isolation also includes isolating memory space so an application can only access memory space that the application is authorized to access. In addition, end-to-end isolation enables data packets for critical applications to be prioritized.

Implementing end-to-end isolation in multi-SoC distributed processing systems, however, is challenging. One approach to provide end-to-end isolation in such systems is for each application on an SoC to be implemented as an independent PCIe device. For example, a safety application could be a first PCIe device, and a non-safety application could be a second PCIe device. A second approach to provide end-to-end isolation in such systems is for each application to be implemented as an independent PCIe function on an SoC. However, both of these approaches increase costs and achieve only partial isolation.

This disclosure describes various examples of a distributed system that resolves the challenges described above. In some examples, the distributed system includes multiple SoCs connected using PCIe. For purposes of this description, two SoCs are assumed, although any number of SoCs may be used. One SoC is an RC, and the other SoC is an endpoint. End-to-end isolation is provided for inbound and outbound traffic for both SoCs, meaning that transactions (e.g., data) from safety and non-safety applications are isolated from each other throughout the system. As described below, end-to-end isolation may be achieved using an Inbound Safety Isolation Unit (to facilitate isolation for transactions being received by an SoC) and an Outbound Safety Isolation Unit (to facilitate isolation for transactions being transmitted by an SoC) on each of the SoCs of the distributed system. Quality of Service (QoS) support, which enables the prioritization of packets and bandwidth, is also provided end-to-end, from an application on a first SoC, through an interconnect on the first SoC, through a PCIe link, through an interconnect on a second SoC, and to another application on the second SoC. QoS support may be achieved using PCIe features that enable the segregation of transaction traffic based on priority (e.g., with safety application transactions being prioritized over non-safety application transactions). Unlike the approaches described above, applications are not implemented as independent PCIe devices or independent PCIe functions, and thus the negative consequences of those approaches are mitigated. Examples of the distributed system are described below with reference to FIGS. 1-7, preceded by a description of terminology relevant to the distributed system.

In a PCIe system, each device has a unique PCIe identifier (ID). Thus, traffic from different PCIe devices may be isolated using the PCIe ID associated with that traffic. As described above, PCIe systems also provide a traffic prioritization feature called QoS support. QoS refers to the capability to route transactions from different applications using differing priority levels and bandwidth allocations. For example, some transactions (e.g., from safety applications) may receive higher priority and guaranteed bandwidth, while other transactions (e.g., from non-safety applications) may not have specific bandwidth or latency requirements.

PCIe systems may implement QoS using features called traffic classes (TCs) and virtual channels (VCs). TCs are categories of transactions that the PCIe system disclosed herein assigns to transactions based on the priority level of that transaction. For example, a TC number of 7 may be assigned to transactions arising from safety applications, while a TC number of 0 may be assigned to transactions arising from non-safety applications. In examples, transactions bearing higher TC numbers are granted preferential treatment within the PCIe system over transactions bearing lower TC numbers.

VCs are virtual constructs used in a PCIe system to arbitrate access to network hardware resources (e.g., hardware channels, buffers, etc.) that transactions use—for example, to flow from one SoC to another. For example, a pair of SoCs in a PCIe system may communicate via a PCIe link with limited hardware channels on the link. In this example, one of the SoCs may use a VC scheme to arbitrate (e.g., multiplex) which transactions gain access to the hardware channels on the PCIe link, how they are transmitted, and when they are transmitted. The PCIe standard defines eight TCs and eight VCs, although the scope of this disclosure is not strictly limited as such. Examples of the PCIe system described herein provide both end-to-end isolation and QoS, and these examples are now described with reference to FIGS. 1-7.

Figure 1:
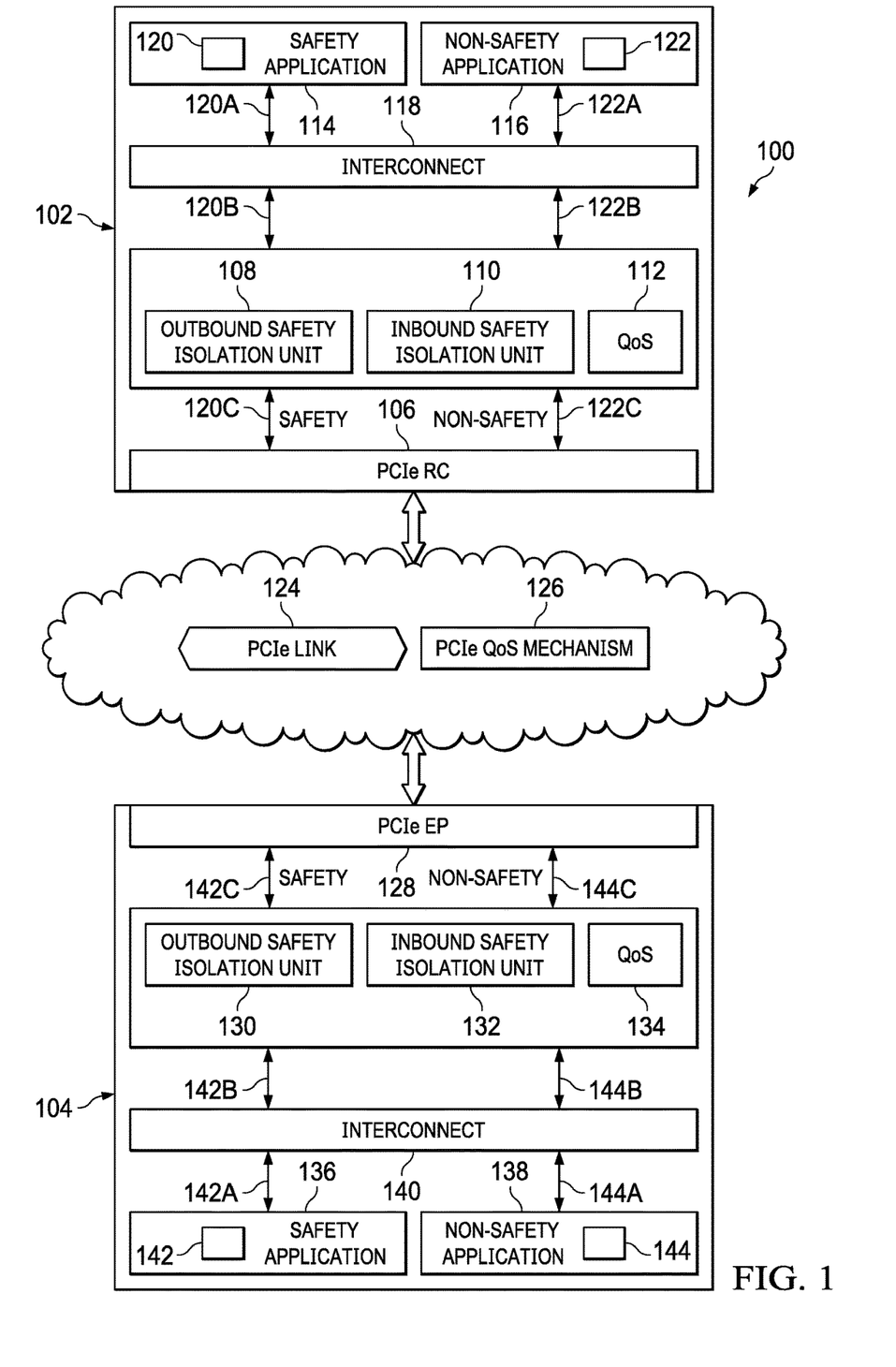
FIG. 1 is a block diagram of a system for providing end-to-end isolation over PCIe in accordance with various examples.

FIG. 1 is a block diagram of a PCIe system 100 for providing end-to-end isolation and QoS over PCIe in accordance with various examples. System 100 includes SoC1 102 and SoC2 104. SoC1 102 and SoC2 104 each provide end-to-end isolation and QoS over PCIe according to an example herein. SoC1 102 and SoC2 104 each may include a number of components that are not expressly shown in FIG. 1. For example, SoC1 102 and SoC2 104 can each include one or more processors, co-processors, controllers, memories, input/output ports, secondary data storages, communication components, sensors, interfaces, digital signal processors, and other components.

SoC1 102 includes a PCIe RC 106. RC 106 is a root complex that is configured to detect and configure devices connected to it. RC 106 generates transaction requests for SoC1 102 and manages transactions according to the PCIe standard. SoC1 102 also includes outbound safety isolation unit 108, inbound safety isolation unit 110, and QoS unit 112. Examples of these units are described below. Outbound safety isolation unit 108 manages and provides isolation and QoS for transactions within SoC1 102 until the transactions reach the PCIe link. Inbound safety isolation unit 110 manages and provides isolation and QoS for transactions that are received by SoC1 102. QoS unit 112 provides QoS for inbound and outbound transactions. Outbound safety isolation unit 108, inbound safety isolation unit 110, and QoS unit 112 can each include any combination of hardware and/or software to perform the functions described herein. Outbound safety isolation unit 108, inbound safety isolation unit 110, and QoS unit 112 may use the resources (processors, memory, etc.) of SoC1 102 to perform these functions, or they may use their own dedicated resources in some examples. Outbound safety isolation unit 108, inbound safety isolation unit 110, and QoS unit 112 operate in conjunction with other components described herein to provide end-to-end isolation and QoS over PCIe.

SoC1 102 also includes two example applications, safety application 114 and non-safety application 116. The safety application 114 and non-safety application 116 may include executable code stored on one or more memories (not expressly shown) in the SoC1 102. In one example, safety application 114 is an application related to an automotive safety function, such as an automated driving function or analytics. Safety application 114 is therefore a critical application in this example, and special processing conditions may apply for transactions from safety application 114, such as a certain QoS level (e.g., priority level). Non-safety application 116 is an application that is not related to an automotive safety function in this example, and is not a critical application. Different processing conditions for transactions from non-safety application 116 may apply compared to those provided for transactions from safety application 114. In examples herein, any number of safety applications 114 or non-safety applications 116 may be executed on SoC1 102 or SoC2 104. The scope of this description is not limited to safety and non-safety applications in the automotive context. Rather, any high-priority or critical application may be deemed a safety application and any low-priority or non-critical application may be deemed a non-safety application, irrespective of context.

SoC1 102 also includes interconnect 118. Although FIG. 1 depicts interconnect 118 as a single, monolithic entity positioned between the applications 114, 116 and the outbound safety isolation unit 130, inbound safety isolation unit 132, and QoS 134, the interconnect 118 may be a distributed entity and/or in one or more positions relative to the remaining components of the SoC1 102. For example, despite the depiction in FIG. 1 of interconnect 118 in a specific location relative to other components of the SoC1 102, traffic may pass through the interconnect 118 each time it is passed from one component to another component in the SoC1 102.

Interconnect 118 may include multiple ports for transmitting transactions and other traffic between components and applications within SoC1 102. Interconnect 118 can include ports dedicated for specific types of traffic, or ports dedicated to specific applications in some examples. Interconnect 118 can also include ports with one or more levels of priority in some examples. Thus, in some examples, the path a transaction takes through the interconnect 118 (e.g., the input and output ports of the interconnect 118 through which a transaction passes) may depend on an attribute associated with that transaction that indicates whether the transaction is from the safety application 114 or non-safety application 116. The path that a transaction takes through the interconnect 118 may determine the priority, isolation, and QoS provided to that transaction. For example, as described in detail below, transactions assigned to specific ports in the interconnect 118 may be assigned a TC number based on those ports, and the TC number may be used in conjunction with corresponding VCs to provide priority, isolation, and QoS to those transactions.

A number of arrows are shown in system 100 to represent transactions. In an example, the safety application 114 provides a safety transaction 120, and the non-safety application 116 provides a non-safety transaction 122. Arrows 120A, 120B, and 120C represent an example path for transaction 120. Arrows 122A, 122B, and 122C represent an example path for transaction 122. The transaction 120 is provided from safety application 114 to interconnect 118, then to outbound safety isolation unit 108, then to RC 106. In another example, the transaction 120 is provided from safety application 114 to the outbound safety isolation unit 108, then to the RC 106, passing through the interconnect 118 one or more times. QoS 112 provides QoS for transaction 120. For example, QoS 112 may map a TC to a port on interconnect 118. Any transaction 120, 122 subsequently passing through that port is assigned the TC of the port, and once that transaction 120, 122 has been assigned the TC of the port, the transaction 120, 122 receives the QoS and isolation associated with that TC.

Upon reaching RC 106, the transaction 120, 122 is transmitted on PCIe link 124 to a destination, such as the SoC2 104. A PCIe QoS mechanism 126 (within the PCIe link 124) may provide a QoS to the transaction 120, 122 according to the PCIe standard during this transmission. The QoS within SoC1 102 can be mapped to the QoS provided by the PCIe link 124 to enable a consistent end-to-end QoS for transactions, as described below. Therefore, a consistent QoS can be provided on each SoC1 102, 104 and on the PCIe link 124. As shown in system 100 and described below, transactions 120 and 122 can also be isolated from one another end-to-end.

In another example, inbound transactions entering SoC1 102 (not shown in FIG. 1) enter SoC1 102 via RC 106 and are then received by inbound safety isolation unit 110, where various operations are performed, as described below. The transaction is then provided to an application, memory, processor, or any appropriate destination. As described above for outbound transactions, the interconnect 118 facilitates the provision of the inbound transaction to the various components of the SoC1 102.

In some examples, SoC2 104 includes components similar to those of SoC1 102. SoC2 104 acts as a multifunction endpoint device in this example, and it can have as much or even more functionality than SoC1 102 in some examples. SoC2 104 includes PCIe endpoint 128, outbound safety isolation unit 130, inbound safety isolation unit 132, and QoS unit 134. These units perform functions similar to their respective counterpart units in SoC1 102. Outbound safety isolation unit 130, inbound safety isolation unit 132, and QoS unit 134 can each include any combination of hardware and/or software to perform the functions described herein. Outbound safety isolation unit 130, inbound safety isolation unit 132, and QoS unit 134 can utilize the resources (processors, memory, etc.) of SoC2 104 to perform these functions, or they may use own dedicated resources in some examples.

SoC2 104 also includes two example applications, safety application 136 and non-safety application 138 (e.g., executable code stored on one or more memories, which are not expressly shown). Like safety application 114, in one example safety application 136 is an application related to an automotive safety function, such as an automated driving function or analytics. Safety application 136 is therefore a critical application in this example, and special processing conditions may apply for transactions from safety application 136, such as a certain QoS level. Non-safety application 138 is an application that is not related to an automotive safety function in this example, and is not a critical application. As described above, the scope of this disclosure is not limited to automotive contexts.

SoC2 104 also includes interconnect 140. Interconnect 140 may be similar to interconnect 118 in examples. Interconnect 140 may include multiple ports for transmitting transactions and other traffic between components and applications within SoC2 104. Interconnect 140 can include ports dedicated for specific types of traffic, or ports dedicated to specific applications in some examples. Interconnect 140 can also include ports with one or more levels of priority in some examples. As with the interconnect 118, the interconnect 140 is depicted as a single, monolithic entity, but in at least some examples, the interconnect 140 may be a distributed entity and/or in one or more positions relative to the remaining components of the SoC2 104.

Arrows 142A, 142B, and 142C represent an example path for safety transaction 142. Arrows 144A, 144B, and 144C represent an example path for non-safety transaction 144. In one example, transaction 142 is provided from safety application 136 to interconnect 140, then to outbound safety isolation unit 130, and then to endpoint 128. In another example, the transaction 142 is provided from safety application 136 to the outbound safety isolation unit 130 and subsequently to the endpoint 128, with the interconnect 140 facilitating the provision of the transaction 142 to one or more of these components. Similarly, in one example, the transaction 144 is provided from non-safety application 138 to interconnect 140, then to outbound safety isolation unit 130, and then to endpoint 128. In another example, the transaction 144 is provided from the non-safety application 138 to the outbound safety isolation unit 130 and subsequently to the endpoint 128, with the interconnect 140 facilitating the provision of the transaction 144 to one or more of these components. After reaching endpoint 128, a transaction is transmitted on PCIe link 124 to a destination. The PCIe QoS mechanism 126 may provide a QoS according to the PCIe standard during this transmission. QoS 134 also provides quality of service for transactions 142 and 144. Like QoS 112, QoS 134 may assign a TC to a port on interconnect 140. Transactions 142 and 144 receive the TC associated with the respective ports they use on interconnect 140, and after having been assigned their respective TCs, they are provided with a specific QoS based on the assigned TC. As shown in system 100 and described below, transactions 142 and 144 can also be isolated from one another end-to-end.

In some examples, inbound transactions entering SoC2 104 (not shown in FIG. 1) enter SoC2 104 via endpoint 128 and are then received by inbound safety isolation unit 132, where various operations are performed, as described below. The transaction is then provided to an application, memory, processor, or any appropriate destination by way of interconnect 140.

Figure 2:
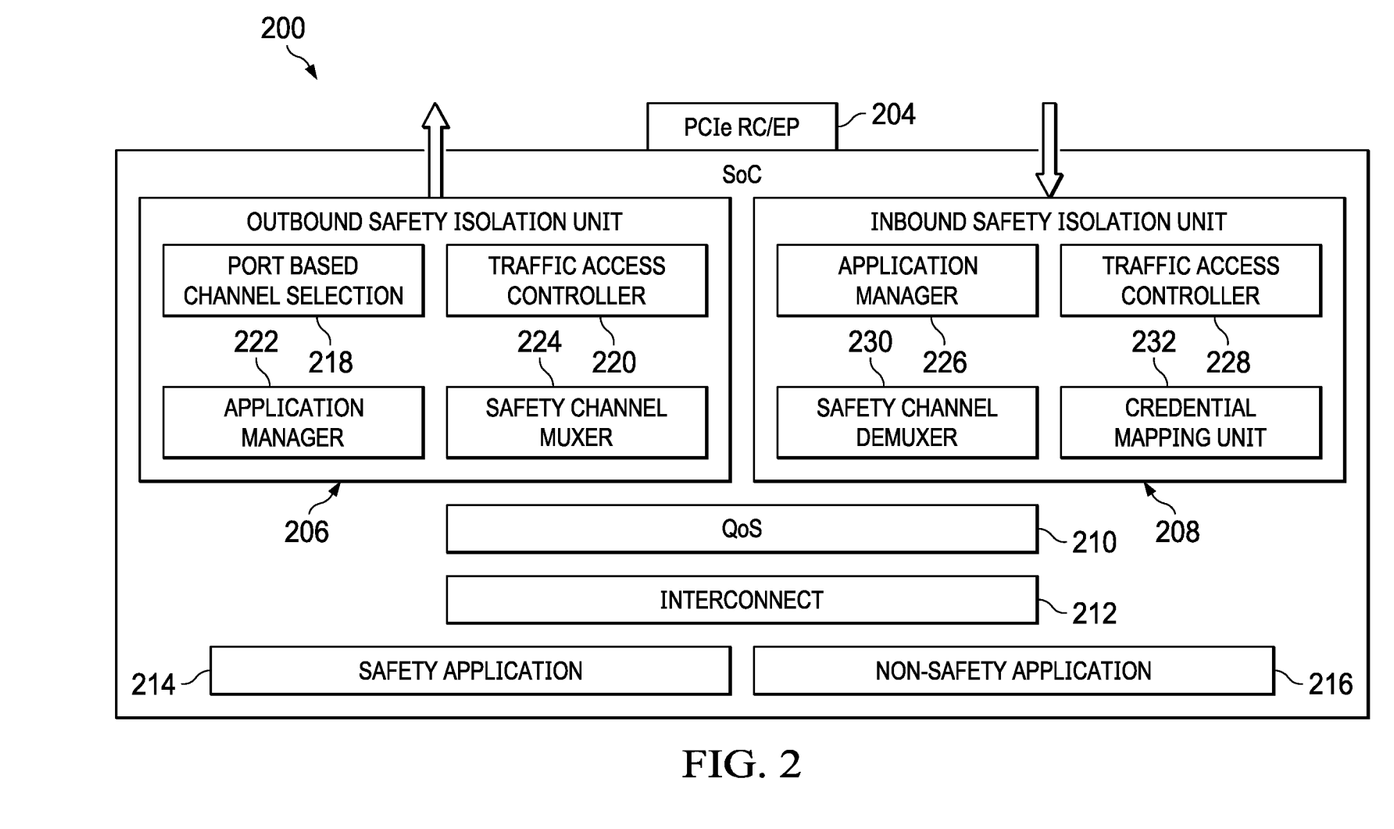
FIG. 2 is a block diagram of a system-on-chip (SoC) for providing end-to-end isolation over PCIe in accordance with various examples.

FIG. 2 is a block diagram of an example SoC 200 for providing end-to-end isolation and QoS over PCIe in accordance with various examples. SoC 200 could include either an RC like SoC1 102, or an endpoint like SoC2 104. SoC 200 includes a PCIe RC or endpoint 204, as shown. The components of SoC 200 operate similarly whether SoC 200 includes an RC 204 or an endpoint 204. SoC 200 includes outbound safety isolation unit 206, inbound safety isolation unit 208, QoS unit 210, and interconnect 212. These components of SoC 200 operate similarly to their respective counterpart components in FIG. 1. In this example, SoC 200 includes two example applications, safety application 214 and non-safety application 216. In other examples, any number of safety applications 214 or non-safety applications 216 may execute on SoC 200.

Outbound safety isolation unit 206 includes port based channel selection 218, traffic access controller 220, application manager 222, and safety channel multiplexer 224. These units within outbound safety isolation unit 206 can each include any combination of hardware and/or software to perform the functions described herein. Each of these units performs a different function, and each such function is now described in turn.

One example function of the outbound safety isolation unit (e.g., outbound safety isolation unit 206) is to assign TC numbers to specific ports of an interconnect. As described above, this action may also be performed by the QoS (e.g., QoS 112 and 134 in FIG. 1), and thus the outbound safety isolation unit and the QoS may perform this action individually or in cooperation with each other. In the context of FIG. 2, the outbound safety isolation unit 206 assigns different TC numbers to different ports of the interconnect 212. This function may be performed by the port based channel selection 218. For example, the port based channel selection 218 may assign a TC number of 7 to an interconnection 212 port that is or will be used to route transactions from safety application 214 (e.g., high-priority transactions), while the port based channel selection 218 may assign a TC number of 0 to an interconnection 212 port that is or will be used to route transactions from non-safety application 216 (e.g., low-priority transactions).

The port of the interconnect 212 through which a transaction is routed depends at least in part on an attribute associated with that transaction. For example, such an attribute may indicate whether a particular transaction is from the safety application 214 (e.g., a high-priority transaction) or from the non-safety application 216 (e.g., a low-priority transaction). Thus, the traffic access controller 220 assigns each transaction to a specific port of the interconnect 212 based on such an attribute of the transaction. In at least some examples, the traffic access controller 220 assigns transactions from safety application 214 to a port having a high priority TC number (e.g., TC number of 7), and the traffic access controller 220 assigns transactions from non-safety application 216 to a port having a low priority TC number (e.g., TC number of 0). In some examples, multiple attributes may be used by the traffic access controller 220 to assign a particular transaction to a specific port of the interconnect 212.

Responsive to passing through a particular port of the interconnect 212, the transaction assumes (e.g., inherits) the TC number of the TC assigned to that port by the port based channel selection 218. For example, the port based channel selection 218 may assign a TC number of 7 to a particular port of the interconnect 212, meaning that this port is designated for high-priority (e.g., safety-critical) transactions. The traffic access controller 220 may then map a transaction from the safety application 214 to that port based on an attribute of the transaction that indicates the transaction is from the safety application 214, and when that transaction passes through the port, the transaction becomes associated with the TC number 7. As a result of becoming associated with the TC number 7, that transaction is subsequently provided with QoS and isolation from transactions having other TC numbers.

Application manager 222 configures other components within outbound safety isolation unit 206, such as the traffic access controller 220, to select an appropriate port for a transaction. Application manager 222 can be embodied in software in one example.

Safety channel multiplexer 224 receives outbound transactions that have been assigned a TC as described above and forwards the transactions to a PCIe link (e.g., PCIe link 124 in FIG. 1), accounting for any QoS restrictions. Specifically, the safety channel multiplexer 224 accesses a TC-to-VC mapping (e.g., in a data structure stored in a memory accessible to the safety channel multiplexer 224) and determines an appropriate VC for each outbound transaction based on the TC of that transaction. For instance, the safety channel multiplexer 224 may receive a transaction having a TC of 7, and the TC-to-VC mapping may indicate that transactions having a TC of 7 are to be assigned to a first VC. Accordingly, the safety channel multiplexer 224 maps that transaction to the first VC, and it prevents other transactions with other TC numbers from being mapped to the first VC. Subsequent allocations of hardware (e.g., buffers, flow control management, etc.) are made for various transactions based on the VCs they have been assigned by the safety channel multiplexer 224. In some examples, transactions on certain higher VCs may be guaranteed bandwidth on physical resources, eliminating hardware resource conflicts with lower-priority traffic. In this manner, high priority transactions are prioritized and protected (e.g., isolated) from lower priority transactions. The TC-to-VC mapping may be the mapping specified by the PCIe standard.

In an example operation, a transaction from an application, such as safety application 214 or non-safety application 216, is received by traffic access controller 220. Traffic access controller 220 assigns the transaction to a port on interconnect 212 based on an attribute, such as whether the transaction is from a safety application or a non-safety application. The transaction then assumes the TC number of the port as the transaction passes through that port. The TC number determines the VC (e.g., VC0, VC1, . . . , VC7) to which the transaction is assigned. Port based channel selection 218 indicates which port is mapped to which VC, for example, using a data structure that cross-references TC numbers with corresponding VCs. A single PCIe link carries transactions from both safety applications and non-safety applications, but the safety channel multiplexer 224 arbitrates hardware resource allocation between the various transactions according to the transactions' VCs so that end-to-end isolation and QoS is maintained. Additional details of the operations of the components in outbound safety isolation unit 206 are described below with respect to FIG. 4.

Prior to describing the inbound safety isolation unit 208 of FIG. 2, a description of various identifiers used in example PCIe systems is provided, as such a description is useful in understanding the function of the inbound safety isolation unit 208. As described above, in a PCIe system, individual devices may have unique PCIe IDs that are useful to identify network traffic (e.g., transactions) associated with a particular device in the PCIe system. As also described above, individual transactions may have attributes that indicate information about the transactions, such as whether a transaction is from the safety application 214 or the non-safety application 216. In an example PCIe system, a PCIe ID may be combined with an attribute (e.g., a safety attribute) to form a context ID. Context IDs may also be referred to herein as system-level context IDs.

Referring still to FIG. 2, inbound safety isolation unit 208 includes application manager 226, traffic access controller 228, safety channel demultiplexer 230, and credential mapping unit 232. These units within inbound safety isolation unit 208 can each include any combination of hardware and/or software to perform the functions described herein.

The credential mapping unit 232 includes a credential mapping table (e.g., a data structure). In some examples, multiple credential mapping tables are included in the credential mapping unit 232. A credential mapping table cross-references PCIe IDs with corresponding context IDs. Credential mapping tables in the credential mapping unit 232 may be configured by the application manager 226. The application manager 226 also may be configured to allocate the context IDs to the credential mapping unit 232. The credential mapping unit 232 receives a transaction and, based on the PCIe ID of the transaction, the credential mapping unit 232 retrieves a corresponding context ID from the appropriate credential mapping table. (The appropriate credential mapping table is selected based on a VC provided by the safety channel demultiplexer 230, which is configured to determine the VC of an incoming transaction based on the TC number associated with that incoming transaction (e.g., using a data structure that cross-references various TC numbers with VCs according to the PCIe standard).) Credential mapping unit 232 subsequently provides the retrieved context ID to traffic access controller 228.

Traffic access controller 228 enforces memory protection based on context ID. As an example, traffic access controller 228 receives inbound transactions that request access to memory. Traffic access controller 228 determines which regions of memory the transaction is allowed to access based on the source of the transaction (determined by the context ID) or an attribute of the transaction, and then traffic access controller 228 either permits or denies the memory access based on one or more rules. For example, certain regions of memory may only be accessed by safety applications, and not by non-safety applications. Traffic access controller 228 enforces such access restrictions.

In an example operation of inbound safety isolation unit 208, an incoming transaction first encounters the safety channel demultiplexer 230. Safety channel demultiplexer 230 decodes the VC associated with the transaction based on the TC number received with the transaction. Credential mapping unit 232 provides a separate credential mapping table for each VC. Based on the VC, one of the credential mapping tables is selected, and the credential mapping table has a unique context ID for each PCIe ID. The credential mapping unit 232 retrieves the context ID from the selected credential mapping table, and it provides the context ID to traffic access controller 228. Based on that context ID, the traffic access controller 228 can block the transaction from the unauthorized access of a memory location. Additional details of the operations of the components in inbound safety isolation unit 208 are described below with reference to FIG. 3.

Figure 3:
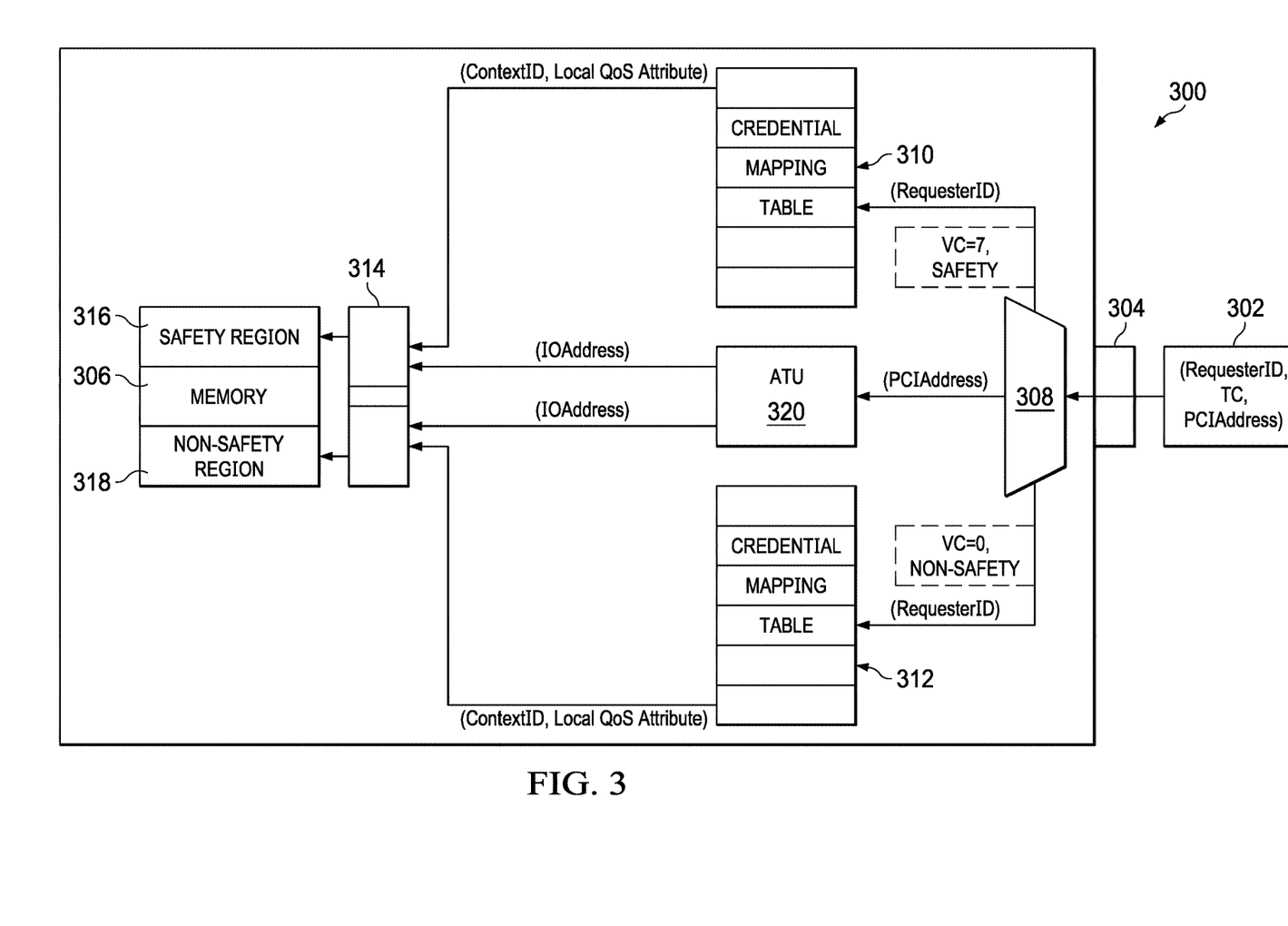
FIG. 3 is a block diagram of an inbound safety isolation unit in accordance with various examples.

FIG. 3 is a block diagram of an inbound safety isolation unit 300 in accordance with various examples. The inbound safety isolation unit 300 is representative of the inbound safety isolation unit 208 in FIG. 2. In some examples, the operation of inbound safety isolation unit 300 is as follows. A transaction 302 enters an inbound (ingress) port 304. The transaction 302 has a PCIe ID (labeled and referred to as a RequesterID in FIG. 3), which indicates the source of the transaction 302. Transaction 302 also has a TC number to indicate its traffic class. Transaction 302 also has a PCIe address, which is used to address a memory region in a memory 306.

After transaction 302 enters inbound port 304, transaction 302 is received by safety channel demultiplexer 308. Safety channel demultiplexer 308 is an example of safety channel demultiplexer 230 in FIG. 2. Safety channel demultiplexer 308 uses the TC number associated with the transaction 302 to retrieve a VC for the transaction 302 from the VC to TC mapping specified by the PCIe standard (e.g., stored in a data structure). Based on the VC, safety channel demultiplexer 308 selects one of the credential mapping tables 310, 312. Although two credential mapping tables 310, 312 are shown in FIG. 3, in an example, up to eight credential mapping tables may be included. Credential mapping tables 310, 312 are examples of the credential mapping tables in credential mapping unit 232 in FIG. 2. In an example, a VC of 7 indicates a safety application, and credential mapping table 310 is selected. In an example, a VC of 0 indicates a non-safety application, and credential mapping table 312 is selected.

The credential mapping tables 310 and 312 store context IDs and may store other attributes (e.g., local QoS attributes). Also, each credential mapping table 310 and 312 has an entry for each requesterID. In an example, if the requesterID associated with a transaction is zero and the attribute (e.g., safety attribute) indicates that the transaction is from a safety application, a corresponding context ID is identified by the respective credential mapping table 310 or 312. If the transaction attribute indicates that the transaction is from a non-safety application and the requesterID is zero, a different context ID is identified. In some examples, the requesterID alone may be sufficient to identify a corresponding context ID from a credential mapping table 310 or 312. In some examples, the credential mapping table 310 or 312 may be accessed to identify a local QoS attribute (e.g., local to the SoC) in addition to the context ID for a particular transaction. The context ID and the local QoS attribute (e.g., safety or non-safety, based on which credential mapping table 310, 312 is used) are provided to traffic access controller 314. Traffic access controller 314 receives the context ID, the local QoS attribute (e.g., safety or non-safety), and the transaction 302, and then it enforces memory protection based on the context ID and the local QoS attribute. In an example of enforcing memory protection, if the local QoS attribute for a transaction indicates a non-safety application, traffic access controller 314 will not permit the transaction to access safety memory region 316. A transaction from a non-safety application will, however, be permitted to access non-safety memory region 318.

In some examples, inbound safety isolation unit 300 includes an optional address translation unit (ATU) 320. PCIe devices use PCIe addresses to send and receive data over a PCIe link. An ATU, such as ATU 320, translates a device internal address into a PCIe address and vice versa. PCIe addresses associated with inbound transactions are translated by the ATU 320 to retrieve an internal memory address in memory 306. The request is then transmitted to traffic access controller 314, and the process continues as described above.

Figure 4:
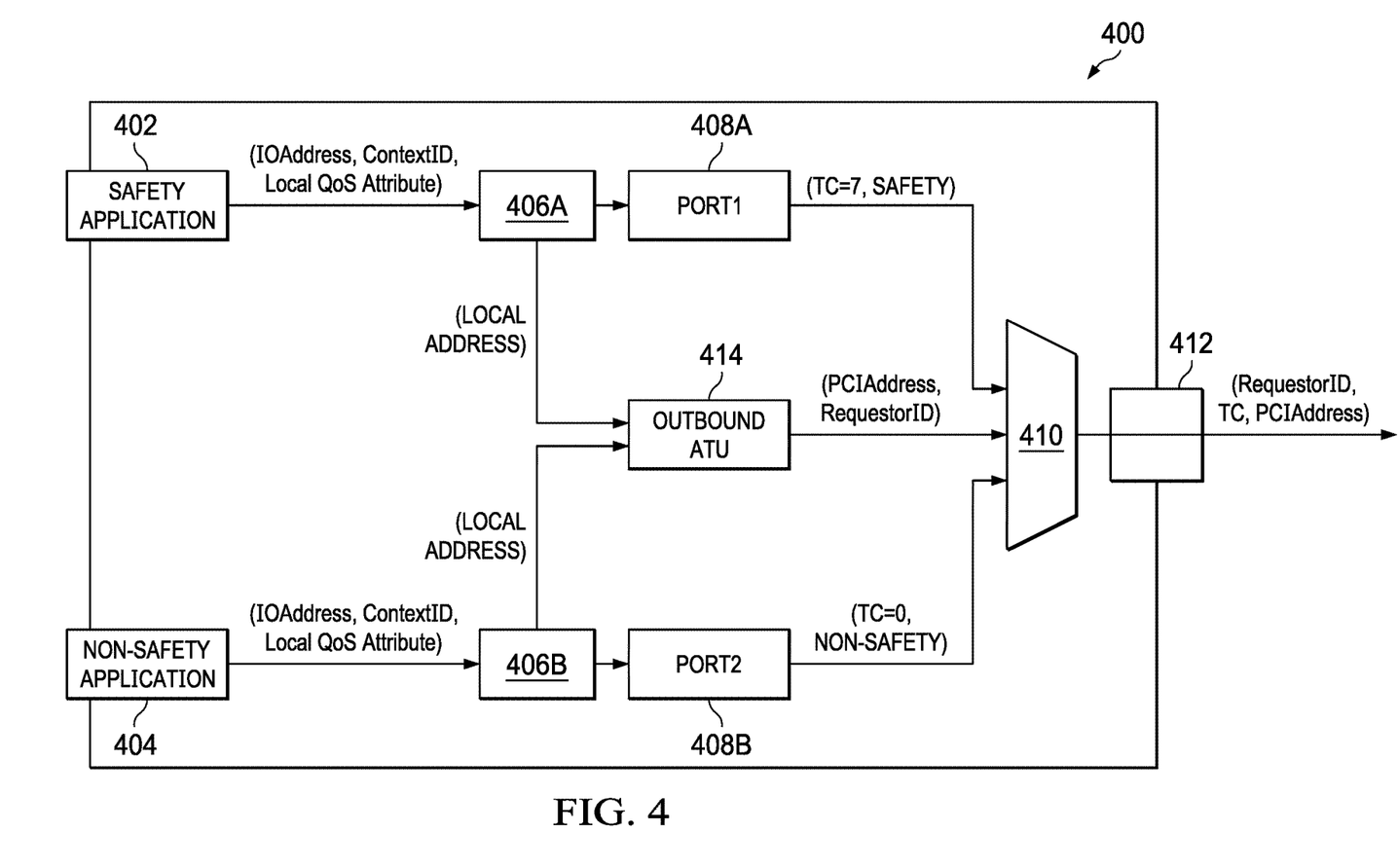
FIG. 4 is a block diagram of an outbound safety isolation unit in accordance with various examples.

FIG. 4 is a block diagram of an outbound safety isolation unit 400 in accordance with various examples. In examples, the operation of outbound safety isolation unit 400 is as follows. An application initiates a transaction targeting a programmed address in memory. The transaction can be initiated by a safety application, such as safety application 402. The transaction can also be initiated by a non-safety application, such as non-safety application 404. The transaction is forwarded to a traffic access controller after it is initiated. The transaction is associated with a local QoS attribute (e.g., indicating whether the transaction is from a safety or non-safety application) that is used to provide a QoS within the SoC. In this example, the traffic access controller is shown as two traffic access controllers 406A and 406B, with the traffic access controller 406A handling transactions from safety applications and the traffic access controller 406B handling transactions from non-safety applications. In other examples, the traffic access controller can be a single traffic access controller. The traffic access controllers 406A and 406B may collectively represent the traffic access controller 220 in FIG. 2, for example.

After determining whether the transaction is from a safety application or a non-safety application based on the local QoS attribute of the transaction (in the case of a single traffic access controller), traffic access controller 406A or 406B selects a port of an interconnect to handle the transaction. Interconnect ports 408A and 408B are shown in this example, although a greater number of ports are useful in other examples. In one example, transactions from the safety application 402 will use a different port than transactions from the non-safety application 404, so a target level of QoS and isolation can be provided for transactions from the safety application 402. In examples, transactions from the safety application 402 are assigned to port 408A, and transactions from the non-safety application 404 are assigned to port 408B. A TC is assigned to each of the port 408A, 408B, and based on the port 408A or 408B the transaction uses, the transaction assumes the TC number assigned to the port 408A or 408B through which the transaction is forwarded. For example, port 408A may be configured with a TC number of 7, while port 408B may be configured with a TC number of 0. Transactions flowing through port 408A assume a TC number of 7, and transactions flowing through port 408B assume a TC number of 0.

From the port 408A or 408B, the transaction is transmitted to the safety channel multiplexer 410. Safety channel multiplexer 410 is an example of safety channel multiplexer 224 in FIG. 2. Safety channel multiplexer 410 retrieves the VC corresponding to the TC number associated with a transaction, based on the TC-to-VC mapping that is part of the PCIe standard and that may be stored in a data structure. Safety channel multiplexer 410 then transmits the transaction through an egress port 412 and hardware dedicated to the VC identified for that transaction. The transaction is associated with a PCIe requester ID (e.g., requesterID in FIG. 4), a TC number, and a PCIe address, the latter of which may be produced by the ATU 414 using a local (e.g., local to the SoC) address. For example, a transaction with a TC number of 7 may be transmitted on hardware corresponding to a specific VC dedicated to transactions with a TC number of 7.

As described above, the local QoS attribute of the transaction (e.g., safety or non-safety) determines the port used by the transaction. The port used by the transaction, in turn, determines the TC assumed by the transaction. Therefore, the local QoS attribute (e.g., safety or non-safety) is indirectly mapped to the PCIe QoS (e.g., the TC), and a specific quality of service is provided to the transaction in both the SoC that contains outbound safety isolation unit 400 and on the PCIe link (e.g., PCIe link 124 in FIG. 1). In the inbound safety isolation unit 300 (shown in FIG. 3), the TC from the PCIe link is mapped to a local QoS attribute, so the quality of service is also maintained within inbound safety isolation unit 300. The QoS is maintained end-to-end by using both the local QoS attributes and the PCIe QoS.

As alluded to above, outbound safety isolation unit 400 includes an optional outbound ATU 414. If any part of the transaction is to be forwarded on a PCIe link, the transaction uses PCIe addresses. If an application, such as application 402 or 404, requests a local address on the SoC, traffic access controller 406A or 406B transmits the local address to outbound ATU 414. Outbound ATU 414 translates the local address to a PCIe address. Also, outbound ATU 414 provides the proper PCIe requester ID for the transaction. The PCIe requester ID is used by an inbound safety isolation unit as described above.

Example implementations can have differentiated classes of applications. A TC can be individually mapped to a VC, or multiple TCs can be mapped to a single VC. A TC number for a transaction is propagated end-to-end in examples herein. The PCIe standard includes eight VCs and eight TCs, but a user may implement a different number of VCs and/or TCs.

To achieve end-to-end isolation for a given application, the application would have its own VC and not share the VC with any other application. Therefore, a safety application may have a dedicated VC in some examples. For applications such as non-safety applications where isolation is not as important, multiple applications could share a VC in some examples.

Figure 5:
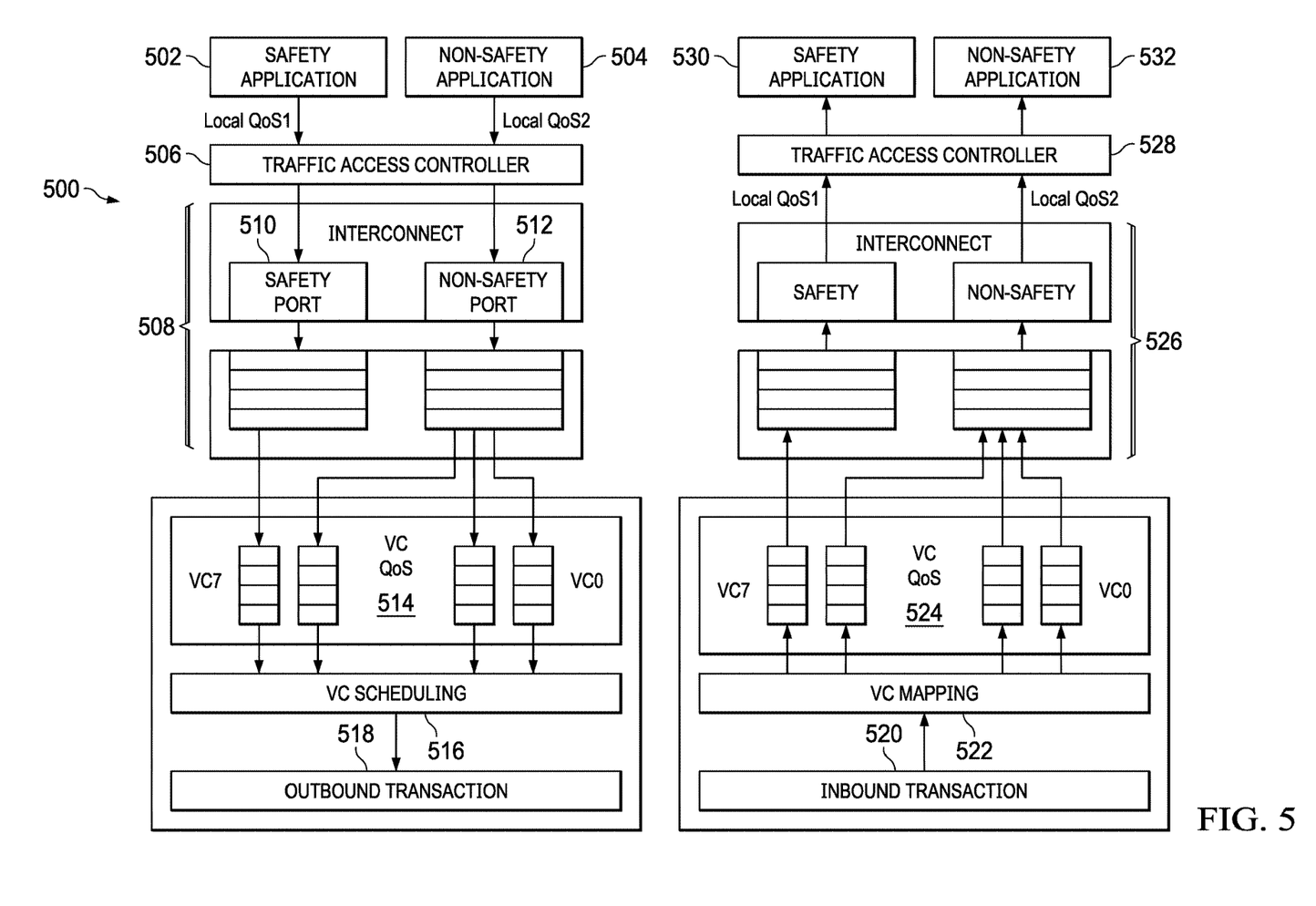
FIG. 5 is a block diagram of a system for providing end-to-end quality of service (QoS) over PCIe in accordance with various examples.

FIG. 5 is a block diagram of a system 500 for providing end-to-end QoS over PCIe in accordance with various examples. The left side of system 500 shows various components that handle an outbound transaction, while the right side shows various components that handle an inbound transaction. System 500 shows how QoS can be provided from an application on one SoC to an application on another SoC.

System 500 includes a safety application 502 and a non-safety application 504 on the outbound side. Traffic access controller 506 determines which portions of memory can be accessed by which applications. Interconnect 508 shows a safety port 510 and a non-safety port 512, such as the ports described above with respect to FIG. 4. Safety port 510 can be a high priority port within interconnect 508. Safety port 510 can be given priority over non-safety port 512 for QoS.

In an example, a first transaction from safety application 502 can have a quality of service level Local QoS1 associated with the transaction. A second transaction from non-safety application 504 can have a quality of service level Local QoS2 associated with the transaction. The attributes QoS1 and QoS2 can be included with the first and second transactions, respectively. These attributes are used by the other components in system 500 to provide a specific QoS for the respective transactions.

Attributes QoS1 and QoS2 may be used by interconnect 508 to select the priority of transactions on interconnect 508. For example, one port (such as safety port 510) could be a high priority port used for QoS1, and one port (such as non-safety port 512) could be a low priority port used for QoS2. In other examples, there could be more than two levels of priority or QoS.

As described above, a transaction passing through a port will assume the TC assigned to that port. As also described, the PCIe standard includes a TC-to-VC mapping, and thus the PCIe system described herein determines an appropriate VC based on the TC number associated with a particular transaction. FIG. 5 shows four VCs 514. As described above, up to eight VCs 514 are used to transmit transactions in examples herein. As shown in system 500, a safety application 502 may have a dedicated port 510 and dedicated VC, shown here as the leftmost VC (VC7). Conversely, multiple non-safety applications (e.g., non-safety application 504) may share one or more VCs, depicted in FIG. 5 as the three right-most VCs, including VC0. VC scheduling 516, such as arbitration of access to hardware or physical components, is then performed by a safety channel multiplexer (e.g., safety channel multiplexer 410 in FIG. 4), and outbound transaction 518 is transmitted over a PCIe link.

VCs 514 and VC scheduling 516 can be aspects of PCIe QoS as defined in the PCIe standard. The examples described herein use the QoS provided by PCIe (e.g., QoS 210 in FIG. 2) along with the components described herein to provide QoS and end-to-end isolation.

On the inbound side of system 500, inbound transactions 520 are allocated to a queue based on the VC associated with the transaction, as determined using VC mapping 522. VC mapping 522 can be performed by a safety channel demultiplexer as described above with respect to FIG. 3. Four VCs 524 are shown, with VC7 used for transactions of a safety application, while the other VCs 524 are used for transactions of non-safety applications in this example. Transactions are provided through interconnect 526 and are allocated to the proper queue as described above with respect to FIG. 3. Based on a context ID retrieved by a credential mapping unit (not expressly shown in FIG. 5), a traffic access controller 528 restricts access to certain parts of memory. Transactions may access safety applications 530 and non-safety applications 532. Traffic access controller 528 also receives the QoS attribute (such as Local QoS1 and Local QoS2) with each transaction, and these attributes are used to provide a QoS on the inbound side of system 500. Therefore, the QoS for the transactions is maintained from end-to-end.

System 500 illustrates how QoS and isolation can be achieved end-to-end according to examples herein. For example, transactions associated with safety applications 502 or 530 are separated from the non-safety transactions over the entire outbound and inbound paths. Certain transactions from critical applications can have dedicated resources, such as dedicated VCs (and their associated hardware), TCs, ports, traffic access controllers, credential mapping units, and memory.

Figure 6:
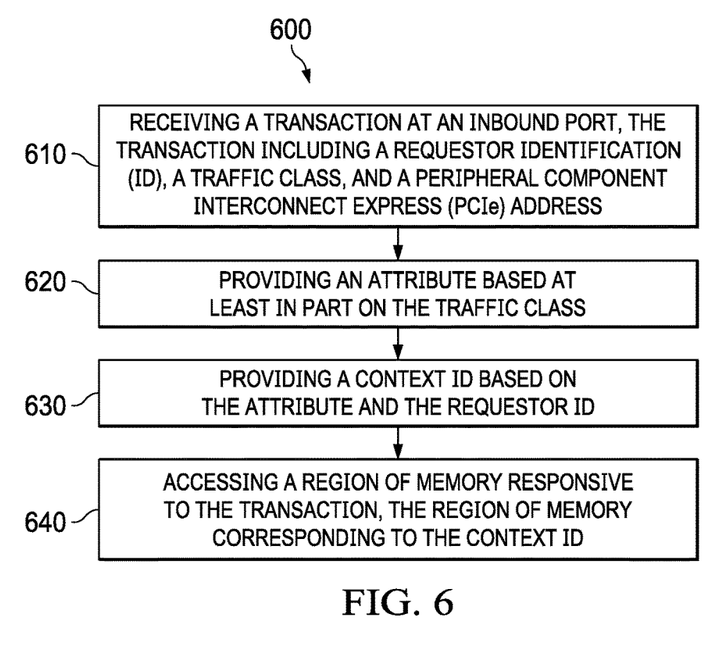
FIG. 6 is a flowchart of a method for handling an inbound PCIe transaction in accordance with various examples.

FIG. 6 is a flowchart of an example method 600 for handling an inbound PCIe transaction in accordance with various examples. Although the method steps are described in conjunction with FIGS. 1, 2, 3, and 5, any system configured to perform the method steps, in any suitable order, falls within the scope of this description. In one example, components of inbound safety isolation unit 300 perform the steps of method 600.

Method 600 begins at 610, where an SoC, RC, or endpoint receives a transaction at an inbound port, the transaction including a requesterID, a traffic class, and a PCIe address. As described above in FIG. 3, an SoC, RC, or endpoint receives a PCIe transaction at an inbound port, such as inbound port 304. The requesterID can be a PCIe ID in an example. The inclusion of the requesterID, traffic class, and PCIe address enables the system to provide end-to-end isolation and QoS as described above.

Method 600 proceeds to 620, where a demultiplexer such as safety channel demultiplexer 308 generates an attribute based at least in part on the traffic class. In an example, the demultiplexer associates the traffic class with either a safety application or a non-safety application.

Method 600 proceeds to step 630, where a credential mapping unit, such as credential mapping unit 232, generates a context ID based on the attribute and the requester ID. The context ID is unique in an example. Multiple credential mapping units 232 and/or credential mapping tables 310 and 312 are used in some examples.

Method 600 proceeds to 640, where a traffic access controller, such as traffic access controller 314, accesses a region of memory responsive to the transaction. The region of memory accessed is determined at least in part by the context ID. Context IDs related to safety applications are permitted to access safety regions of memory, such as safety memory region 316. Context IDs related to non-safety applications are permitted to access non-safety memory regions, such as non-safety memory region 318.

Figure 7:
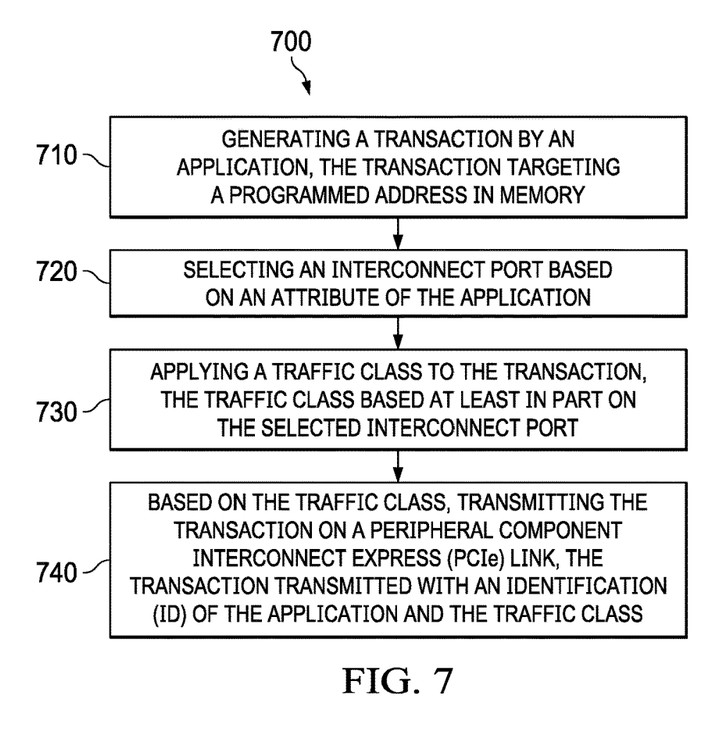
FIG. 7 is a flowchart of a method for handling an outbound PCIe transaction in accordance with various examples.

FIG. 7 is a flowchart of an example method 700 for handling an outbound PCIe transaction in accordance with various examples. Although the method steps are described in conjunction with FIGS. 1, 2, 4, and 5, any system configured to perform the method steps, in any suitable order, falls within the scope of this description. In one example, components of outbound safety isolation unit 400 perform the steps of method 700.

Method 700 begins at 710, where an application generates a transaction, the transaction targeting a programmed address in memory. The transactions can be generated by an application such as safety application 402 or non-safety application 404 in an example. The transactions can be any suitable type of PCIe transaction, such as a read or a write transaction.

Method 700 continues at 720, where a traffic access controller forwards the transaction to a selected port of an interconnect, the selected port being selected based on an attribute of the application. In an example, a traffic access controller such as traffic access controller 406A or 406B (e.g., FIG. 4) forwards the transaction to a port based on an attribute, such as the type of the application associated with the transaction (e.g., a safety application or a non-safety application). Transactions from safety applications can be forwarded to a first port, while transactions from non-safety applications can be forwarded to a second port.

Method 700 continues at 730, where the selected port applies a traffic class to the transaction, the traffic class based at least in part on the selected port. In one example, each port is associated with a specific TC. Because TCs are mapped to VCs, the port indirectly defines which VC the transaction is assigned to, and associates the transaction to a predefined VC in one example.

Method 700 continues at step 740, where the transaction is transmitted on a PCIe link, the transaction transmitted with a PCIe ID of the application (e.g., the requesterID), the TC, and the translated PCIe address, as described above. The inclusion of the PCIe requester ID, traffic class, and PCIe address as part of the transaction enables the system to provide end-to-end isolation and QoS, as described above.

Methods and systems described herein realize end-to-end isolation and QoS in a PCIe system. Memory space isolation is provided to isolate memory designated for safety applications from accesses by transactions of non-safety applications. Also, QoS is provided for safety applications.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Unless otherwise stated, "about," "approximately," or "substantially" preceding a value means+/−10 percent of the stated value. Modifications are possible in the described examples, and other examples are possible within the scope of the claims.

What is claimed is:

1. A method, comprising:
    receiving a transaction at an inbound port, the transaction including a requester identification (ID), a traffic class, and a peripheral component interconnect express (PCIe) address;
    providing an attribute based at least in part on the traffic class, the attribute indicating a type of an application that generated the transaction;
    providing a context ID based on the attribute and the requester ID;
    accessing a first region of a memory responsive to the transaction, the first region of the memory corresponding to the context ID; and
    blocking access to a second region of the memory based on the context ID.

2. The method of claim 1, wherein the attribute also indicates a traffic path through an interconnect.

3. The method of claim 1, wherein the type of the application that generated the transaction includes a safety application and a non-safety application.

4. The method of claim 3, wherein the first region of memory accessed is determined at least in part on the type of the application.

5. The method of claim 1, further comprising translating the PCIe address to a local address to access the first region of memory.

6. The method of claim 1, further comprising providing a local interconnect quality of service (QOS) based on the traffic class.

7. The method of claim 1, further comprising:
    selecting a credential mapping table, among multiple credential mapping tables, based on the attribute; and
    identifying the context ID in the selected credential mapping table based on the requestor ID and the attribute.

8. The method of claim 7, wherein the identifying further comprises:
    identifying a quality of service (QOS) attribute in the selected credential mapping table; and
    providing the QoS attribute with the context ID.

9. A method, comprising:
    generating a transaction by an application, the transaction targeting a programmed address in a memory;
    selecting an interconnect port, among multiple interconnect ports, based on an attribute of the transaction, the attribute indicative of a criticality level of the application;
    forwarding the transaction to the selected interconnect port;
    applying a traffic class to the transaction, the traffic class based at least in part on the selected interconnect port, wherein the traffic class includes information indicative of the attribute; and
    based on the traffic class, transmitting the transaction on a peripheral component interconnect express (PCIe) link, the transaction transmitted with a PCIe identification (ID) of the application and the traffic class.

10. The method of claim 9, further comprising routing the transaction through the interconnect port based on the attribute.

11. The method of claim 9, further comprising translating the programmed address from a local address to a PCIe address and generating a requester identification (ID) for the transaction, the requester ID identifying a PCIe device storing the application.

12. The method of claim 9, where transmitting the transaction includes transmitting the transaction with resources dedicated to the traffic class.

13. The method of claim 9, wherein the attribute is a first local attribute of an originating component in which the transaction is generated, the method further comprising:
    mapping the traffic class to a second local attribute of a destination component where the transaction is received via the PCIe link to maintain a quality of service from the generating of the transaction by the originating component to the receiving of the transaction by the destination component.

14. A system, comprising:
    an application configured to generate a peripheral component interconnect express (PCIe) transaction, the transaction having a local quality of service (QOS) attribute and a context identification (ID);
    a traffic access controller configured to select a port among multiple ports, in an interconnect for the transaction, the selected port based at least in part on the local QOS attribute of the application; and
    a multiplexer configured to receive from the selected port the transaction and an associated traffic class indicative of the selected port and the local QoS, and transmit the transaction on a PCIe link, the transaction transmitted with a PCIe device identification (ID) and the traffic class.

15. The system of claim 14, wherein the traffic access controller is also configured to manage memory access to a PCIe address space based at least in part on the context ID.

16. The system of claim 14, where the local QOS attribute indicates a type of the application that generated the transaction.

17. The system of claim 14, where the interconnect is configured to pass transactions through an interconnect port based at least in part on the local QoS attribute.

18. The system of claim 14, further comprising:
    a demultiplexer configured to receive the transaction via an inbound port, the demultiplexer also configured to select a credential mapping table for the transaction based on a virtual channel (VC) of the transaction.

19. The system of claim 18, further comprising:
    a credential mapping table configured to generate the local QoS attribute and the context ID based at least in part on a PCIe requester ID for the transaction.

* * * * *